United States Patent
Lu et al.

(10) Patent No.: US 9,756,383 B2
(45) Date of Patent: Sep. 5, 2017

(54) SYSTEM AND METHOD FOR DYNAMIC CONTROL OF DOWNLOADING MULTIPLE VIDEOS

(71) Applicants: NANNING FUGUI PRECISION INDUSTRIAL CO., LTD., Nanning (CN); HON HAI PRECISION INDUSTRY CO., LTD., New Taipei (TW)

(72) Inventors: Zong-Xian Lu, New Taipei (TW); Shih-Pin Chen, New Taipei (TW)

(73) Assignees: NANNING FUGUI PRECISION INDUSTRIAL CO., LTD., Nanning (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/970,879

(22) Filed: Dec. 16, 2015

(65) Prior Publication Data
US 2017/0155950 A1   Jun. 1, 2017

(30) Foreign Application Priority Data
Nov. 27, 2015   (TW) .............................. 104139761 A

(51) Int. Cl.
  H04N 7/173 (2011.01)
  H04N 21/4363 (2011.01)
  H04N 21/436 (2011.01)
  H04N 21/41 (2011.01)
  H04N 21/44 (2011.01)
  (Continued)

(52) U.S. Cl.
  CPC ..... H04N 21/4363 (2013.01); H04N 21/4113 (2013.01); H04N 21/438 (2013.01); H04N 21/43615 (2013.01); H04N 21/44004 (2013.01); H04N 21/440272 (2013.01); H04N 21/8456 (2013.01); H04N 21/234372 (2013.01); H04N 21/24 (2013.01)

(58) Field of Classification Search
  CPC .................. H04N 21/234372; H04N 21/24
  USPC .................................................. 725/94, 95
  See application file for complete search history.

(56) References Cited

U.S. PATENT DOCUMENTS

| 8,473,630 | B1 * | 6/2013 | Galligan | ............ | H04N 21/2402 709/224 |
| 9,019,126 | B2 * | 4/2015 | Zarka | ............... | G08G 1/096716 340/905 |

(Continued)

FOREIGN PATENT DOCUMENTS

| CN | 103188522 A | 7/2013 |
| CN | 104604241 A | 5/2015 |
| WO | 2007009876 A1 | 1/2007 |

*Primary Examiner* — Pankaj Kumar
*Assistant Examiner* — Sahar Baig
(74) *Attorney, Agent, or Firm* — Steven Reiss

(57) ABSTRACT

A system for adaptive control of the download of multiple videos includes at least one electronic device, a client coupled to the at least one electronic device, and a displaying device coupled to the client. The electronic device includes a video content divided into a plurality of video chunks. The client downloads each video chunk according to a bandwidth change trend and a displaying of an aspect ratio that is displayed on the displaying device and adjusts instant bandwidth change trend in downloading each video chunk. A method for such adaptive downloading control is also provided.

7 Claims, 4 Drawing Sheets

(51) Int. Cl.
    *H04N 21/4402*   (2011.01)
    *H04N 21/845*    (2011.01)
    *H04N 21/438*    (2011.01)
    H04N 21/2343   (2011.01)
    H04N 21/24     (2011.01)

(56) References Cited

U.S. PATENT DOCUMENTS

| | | | |
|---|---|---|---|
| 9,455,932 B2* | 9/2016 | Phillips | H04L 65/4084 |
| 2006/0247919 A1* | 11/2006 | Specht | G10L 21/06 |
| | | | 704/201 |
| 2009/0319536 A1* | 12/2009 | Parker | H04N 21/2343 |
| 2012/0144444 A1 | 6/2012 | Hunt | |
| 2014/0173025 A1* | 6/2014 | Killick | H04N 21/266 |
| | | | 709/217 |
| 2014/0321324 A1* | 10/2014 | Beshai | H04L 49/15 |
| | | | 370/254 |
| 2014/0325522 A1* | 10/2014 | Li | G06F 3/061 |
| | | | 718/104 |
| 2015/0039714 A1* | 2/2015 | Venturi | H04L 65/60 |
| | | | 709/213 |
| 2015/0249623 A1* | 9/2015 | Phillips | H04L 65/4084 |
| | | | 709/219 |
| 2016/0248835 A1* | 8/2016 | Petrangeli | H04L 65/608 |

\* cited by examiner

SYSTEM AND METHOD FOR DYNAMIC CONTROL OF DOWNLOADING MULTIPLE VIDEOS

FIELD

The subject matter herein generally relates to downloading large data files and a related method.

BACKGROUND

As technology progresses, portable communication devices capable of connecting to a network and displaying videos, such as smart phones, tablet computers, or handheld game consoles, have become more and more popular. In consideration of the portability and convenience in use, a plurality of video contents can be downloaded to be displayed on the larger displaying area.

BRIEF DESCRIPTION OF THE DRAWINGS

Implementations of the present technology will now be described, by way of example only, with reference to the attached figures.

DETAILED DESCRIPTION

Figure 1:
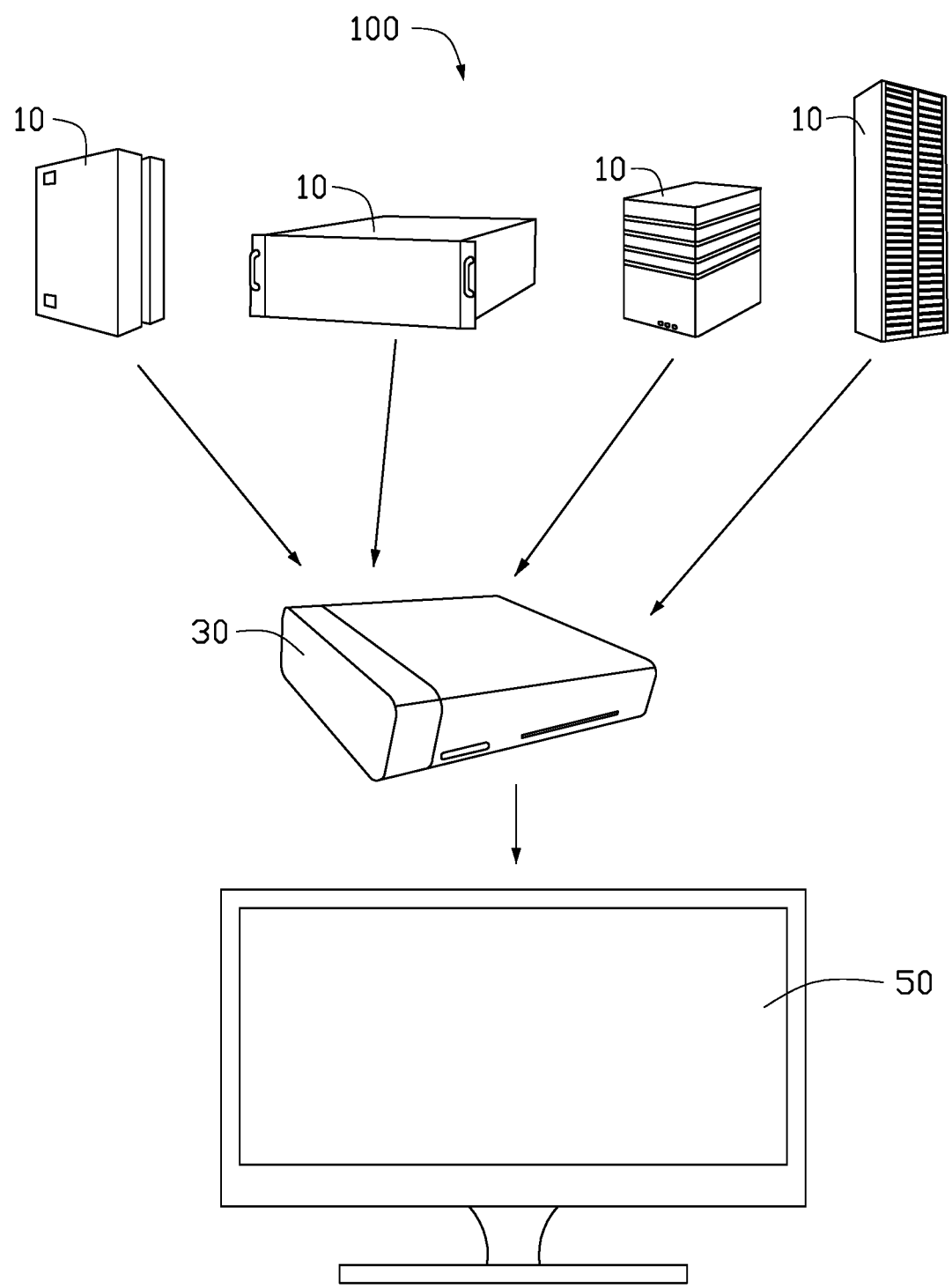
FIG. 1 is a diagrammatic view of an example embodiment of a system for dynamic control of downloading multiple videos.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like. In general, the word "module", as used herein, refers to logic embodied in hardware or firmware, or to a collection of software instructions, written in a programming language. The software instructions in the modules may be embedded in firmware, such as in an erasable programmable read-only memory (EPROM) device. The modules described herein may be implemented as either software and/or hardware modules and may be stored in any type of computer-readable medium or other storage device.

The present disclosure is described in relation to a system for dynamic control of downloading multiple videos. The system includes at least one electronic device, a client coupled to the at least one electronic device, and a displaying device coupled to the client. The at least one electronic device includes a video content which is divided into a plurality of video chunks. The client downloads each video chunk according to a bandwidth change trend and a display of an aspect ratio that is displayed on the displaying device and adjusts an instant bandwidth change trend of downloading each video chunk. The disclosure further offers a method for dynamic control of downloading multiple videos.

FIG. 1 illustrates an embodiment of a system 100 for dynamic control of downloading multiple videos. The system 100 can include at least one electronic device 10, a client 30 coupled to the at least one electronic device 10, and a displaying device 50 coupled to the client 30. In at least one embodiment, the client 30 is coupled to the at least one electronic device 10 and the displaying device 50 wirelessly or by wires. The client 30 is configured to process at least one video content from the at least one electronic device 10 to be displayed on the displaying device 50. In at least one embodiment, the at least one electronic device 10 can be a server or a personal computer. For example, four electronic devices 10 are illustrated in FIG. 1, and a video content can be stored in each electronic device 10 and can be divided into a plurality of video chunks by the electronic device 10.

Figure 2:
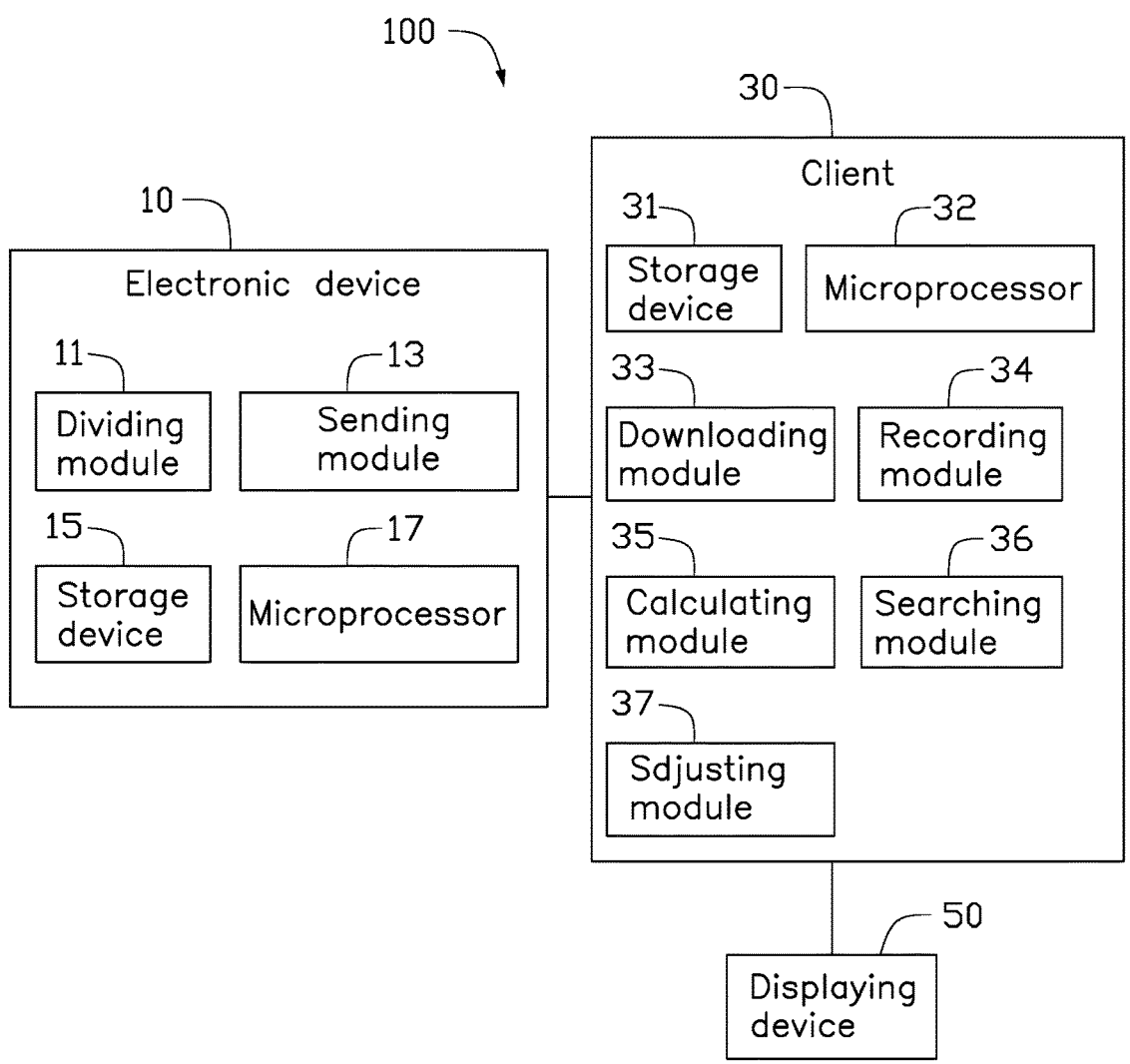
FIG. 2 is a block diagram of an example embodiment of the system for dynamic control of downloading multiple videos of FIG. 1.

FIG. 2 illustrates a system 100 for dynamic control of downloading multiple videos. Each electronic device 10 can include a dividing module 11 and a sending module 13 coupled to the dividing module 11. The dividing module 11 is configured to divide the video content into the plurality of video chunks, and the sending module 13 is configured to send the plurality of video chunks to the client 30. In at least one embodiment, the dividing module 11 and the sending module 13 are comprised of computerized instructions in the form of one or more computer-readable programs stored in a storage device 15 of the electronic device 10 and executed by the at least one microprocessor 17 in the electronic device 10. That is, the dividing module 11 and the sending module 13 are executed by at least one microprocessor 17. FIG. 2 is only one example of the system 100, other examples may comprise more or fewer components than those shown in the illustrated embodiment, or have a different configuration of the various components. In at least one embodiment, the storage device 15 can be a storage device, such as a random access memory (RAM) for temporary storage of information, and/or a read only memory (ROM) for permanent storage of information. In at least one embodiment, the storage device 15 also can be an external storage device, such as an external hard disk, a storage card, or a data storage medium.

The client 30 can include a plurality of modules comprising computerized instructions in the form of one or more computer-readable programs stored in a storage device 31 of the client 30 and executed by the at least one microprocessor 32 in the client 30. In at least one embodiment, the plurality of modules can include a downloading module 33, a recording module 34, a calculating module 35, a searching module 36, and an adjusting module 37.

The downloading module 13 downloads video chunks of each electronic device 10. In at least one embodiment, the downloading module 13 is configured to choose a lowest bitrate to download a first video chunk of the plurality of video chunks, thus allowing the recording module 34 to record a downloading speed of the first video chunk. The calculating module 35 is configured to calculate an actual downloading time of the first video chunk and an aspect ratio of the video content being downloaded for each electronic device 10. In at least one embodiment, the display of an aspect ratio of the video content of each electronic device is arranged according to a decreasing order. When the displaying of an aspect ratio of the video content has been arranged according to the decreasing order, the downloading module 33 downloads three video chunks according to the displaying of the aspect ratio in the decreasing order, and also forecast an actual download time of a next chunk. In at least one embodiment, the downloading module 33 can be configured to download at least two chunks according to the displaying of an aspect ratio in the decreasing order. When the three video chunks of each electronic device 10 are all downloaded by the downloading module 33, a first video content, comprising the three video chunks of each electronic device 10, can be displayed on the displaying device 50.

When a subsequent video content needs to be displayed on the displaying device 50, the calculating module 35 sorts the plurality of video chunks of all the electronic devices 10 into a first species and a second species, allowing the downloading module 35 to download the plurality of video chunks according to the first species and the second species. In at least one embodiment, the first species is an instant buffer state, and the second species is an instant bandwidth change trend. The instant buffer state can include an instant buffer adequacy state and an instant buffer insufficiency state. Generally, a bandwidth change trend can include maximum and minimum values of the bandwidth change trend. In at least one embodiment, the maximum value of the bandwidth change trend can be 1.05M, and the minimum value of the bandwidth change trend can be 0.95M. When the instant bandwidth change trend is greater than such maximum value, the instant bandwidth change trend can be regarded as too fast. When the instant bandwidth change trend is lower than the minimum value of the bandwidth change trend, the instant bandwidth change trend can be regarded as too slow. When the instant bandwidth change trend is between the minimum and maximum values the instant bandwidth change trend can be regarded as suitable for purposes of adapting.

In at least one embodiment, when a difference between a total number of video chunks to be downloaded and downloaded video chunks number is greater than three, the calculating module 35 is configured to place all the video chunks to an instant buffer adequacy area. All the video chunks can be sorted to a first category, a second category, and a third category, according to the instant bandwidth change trend. The first category is a video chunk of which the instant bandwidth change trend is lower than the minimum value of the bandwidth change trend, the second category is a video chunk of which the instant bandwidth change trend is between the minimum value of the bandwidth change trend and the maximum value of the bandwidth change trend, and the third category is a video chunk of which the instant bandwidth change trend is greater than the maximum value of the bandwidth change trend.

When a difference between a total number of video chunks to be downloaded and downloaded video chunks is less than three, the calculating module 35 is configured to place all the video chunks to an instant buffer insufficiency area. All the video chunks can be sorted to a first category, a second category and a third category according to the instant bandwidth change trend. The first category is a video chunk of which the instant bandwidth change trend is lower than the minimum value of the bandwidth change trend, the second category is a video chunk of which the instant bandwidth change trend is between the minimum value of the bandwidth change trend and the maximum value of the bandwidth change trend, and the third category is a video chunk of which the instant bandwidth change trend is greater than the maximum value of the bandwidth change trend.

The downloading module 33 can firstly download the plurality of video chunks in the instant buffer insufficiency area. In the downloading, the searching module 36 can be configured to search whether a video chunk has a largest displaying of an aspect ratio needing to be displayed on the displaying device 50. If the video chunk has a largest displaying of an aspect ratio, the downloading module 33 can firstly download that video chunk. If a video chunk with a largest display of an aspect ratio does not exist in the instant buffer insufficiency area, the searching module 36 can be configured to search whether there is a video chunk of the subsequent lowest category existing in the instant buffer insufficiency area, that is, a video chuck of which the instant bandwidth change trend is lower than the minimum value of the bandwidth change trend. Thus, the plurality of video chunks can be downloaded by the downloading module 33 in a particular order. For example, the downloading module 33 firstly downloads the first category of video chunks (of which the instant bandwidth change trend is lower than the minimum value of the bandwidth change trend), secondly the second category of video chunks, and thirdly the third category of video chunks.

After the plurality of video chunks in the instant buffer insufficiency area have been downloaded, the downloading module 33 can download the plurality of video chunks in the instant buffer adequacy area. In the downloading, the downloading module 33 can download the plurality of video chunks in a particular order. For example, the downloading module 33 firstly downloads the first category of video chunks (of which the instant bandwidth change trend is lower than the minimum value of the bandwidth change trend), secondly the second category of video chunks, and thirdly the third category of video chunks.

When the plurality of video chunks is downloaded by the downing module 33, the next video content can be displayed on the displaying device 50.

In at least one embodiment, when the instant bandwidth change trend is greater than the maximum value of the bandwidth change trend or less than the minimum value of the bandwidth change trend, the adjusting module 37 can adjust the instant bandwidth change trend, to locate it between the minimum value of the bandwidth change trend and the maximum value of the bandwidth change trend.

Figure 3:
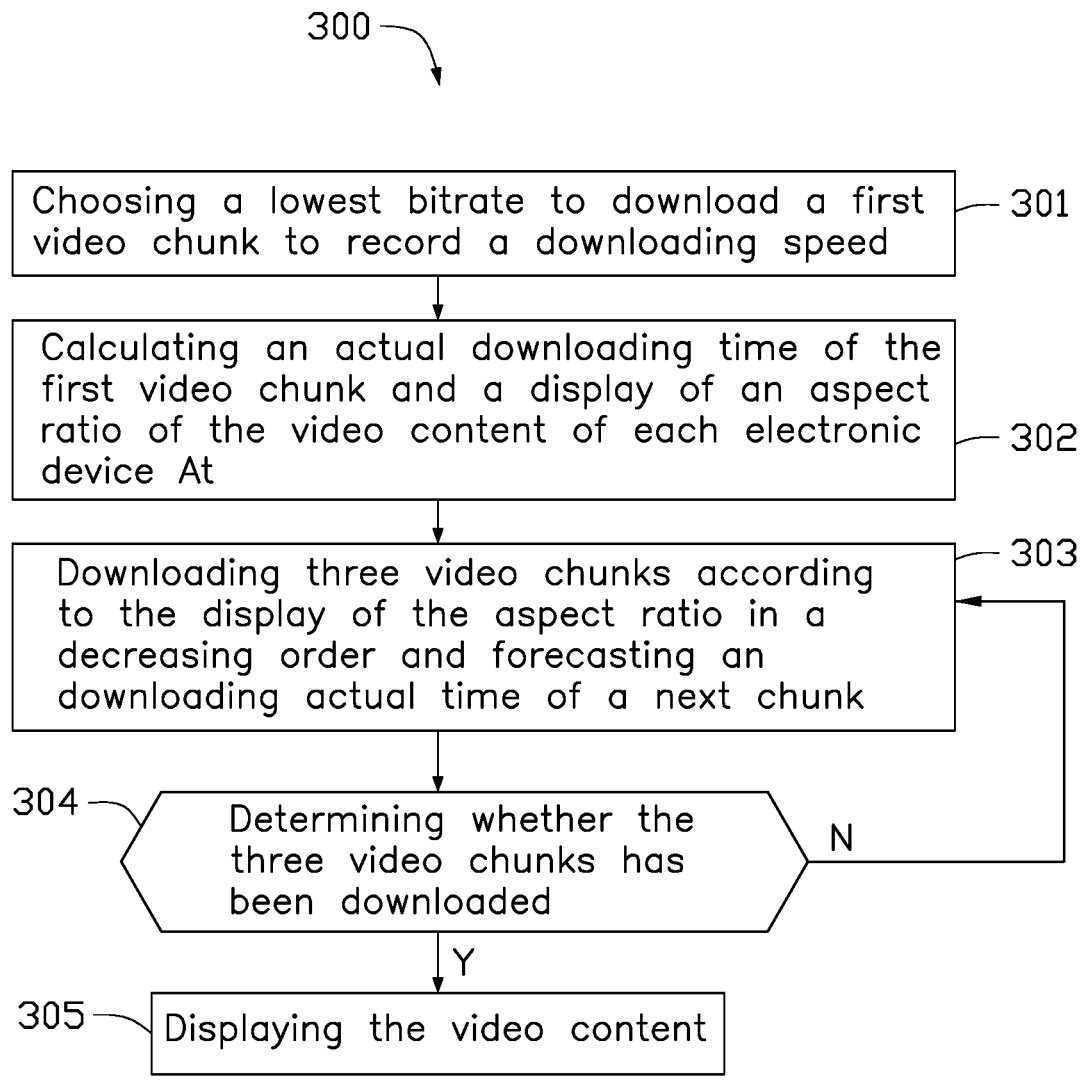
FIG. 3 is a flowchart of a method for dynamic control of downloading multiple videos using the system of FIG. 2.

Referring to FIG. 3, a flowchart is presented in accordance with an example embodiment. The example method 300 is provided by way of example, as there are a variety of ways to carry out the method. The method 300 described below can be carried out using the configurations illustrated in FIGS. 1-2, for example, and various elements of these figures are referenced in explaining example method 300. Each block shown in FIG. 3 represents one or more processes, methods, or subroutines, carried out in the exemplary method 300. Additionally, the illustrated order of blocks is by example only and the order of the blocks can change. The exemplary method 300 can begin at block 301.

At block 301, choosing a lowest bitrate to download a first video chunk of the plurality of video chunks by the downloading module 13, and recording a downloading speed of the downloading the first video chunk by the recording module 34.

At block 302, calculating an actual download time of downloading the first video chunk and an display of an aspect ratio of the video content being downloaded of each electronic device 10 needing to be displayed on the displaying device 50. In at least one embodiment, the display of an aspect ratio of the video content of each electronic device is arranged according to a decreasing order.

At block 303, downloading three video chunks according to the display of the aspect ratio in the decreasing order, and also forecasting an actual download time of a subsequent chunk by the downloading module 33.

At block 304, determining whether the three video chunks has been downloaded by the client 30, if yes, goes on block 305, if no, goes back block 303.

At block 305, displaying the video content the displaying device 50, and the video content includes the three video chunks.

Figure 4:
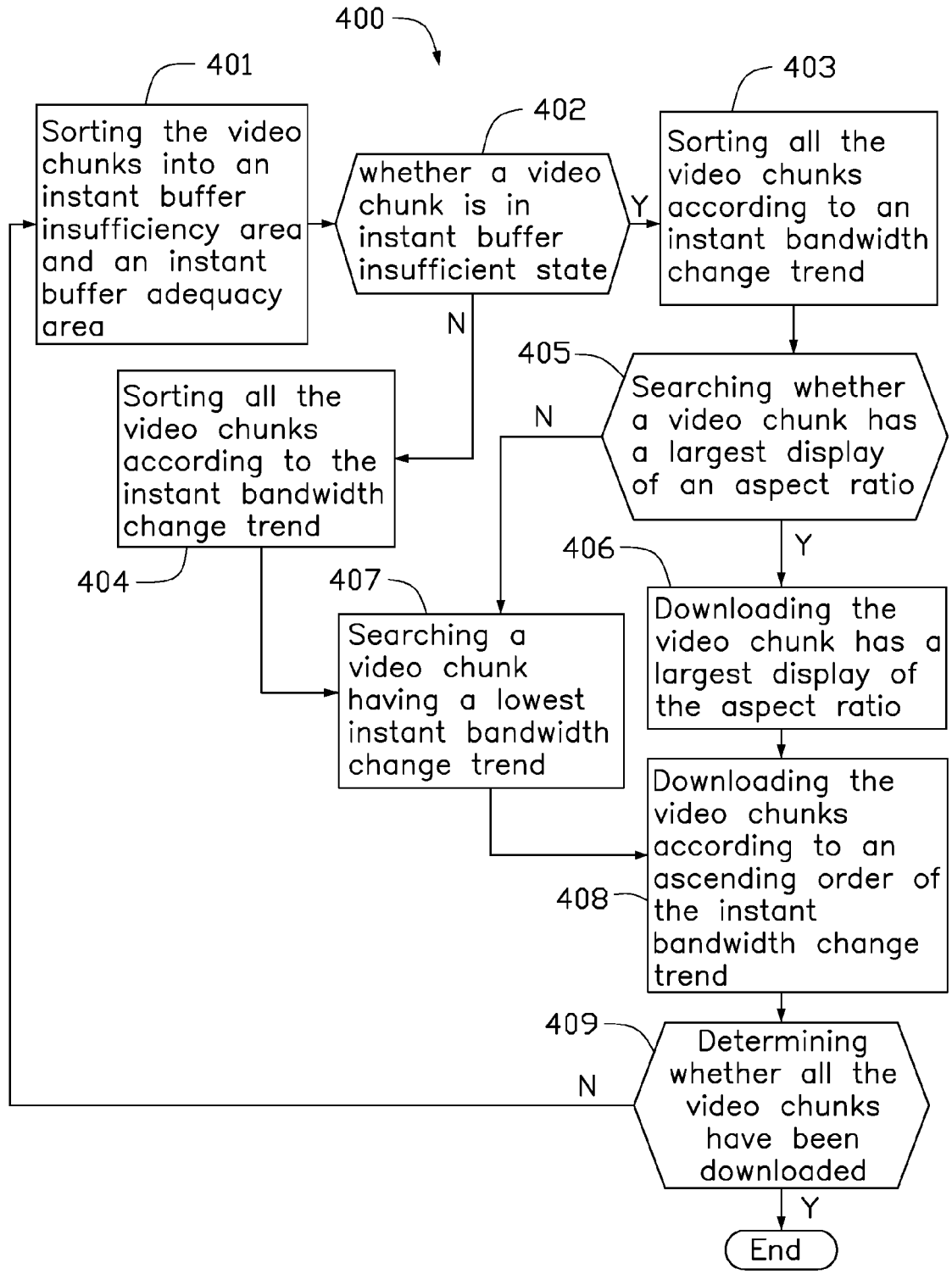
FIG. 4 is a flowchart of a method of downloading subsequent video content using the system of FIG. 2.

FIG. 4 illustrates a method 400 of downloading a next video content by the downloading module 33. The exemplary method 400 can begin at block 401.

At block 401, sorting the plurality of video chunks of all the electronic devices 10 into the instant buffer insufficiency area and the instant buffer adequacy area by the calculating module 35. For example, when a difference between a total number of video chunks to be downloaded and downloaded video chunks is less than three, the calculating module 35 is configured to place all the video chunks to the instant buffer insufficiency area. When a difference between a total number of video chunks to be downloaded and downloaded video chunks is greater than three, the calculating module 35 is configured to place all the video chunks to an instant buffer adequacy area.

At block 402, determining whether a video chunk is in the instant buffer insufficiency area, If yes, goes on block 403, if a video chunk is in the instant buffer adequacy area, goes on block 404.

At block 403, sorting all the video chunks in the instant buffer insufficiency to a first category, a second category and a third category according to the instant bandwidth change trend. The first category is a video chunk of which the instant bandwidth change trend is lower than the minimum value of the bandwidth change trend, the second category is a video chunk of which the instant bandwidth change trend is between the minimum value of the bandwidth change trend and the maximum value of the bandwidth change trend, and the third category is a video chunk of which the instant bandwidth change trend is greater than the maximum value of the bandwidth change trend.

At block 404, sorting all the video chunks in the instant buffer adequacy area to a first category, a second category and a third category according to the instant bandwidth change trend. The first category is a video chunk of which the instant bandwidth change trend is lower than the minimum value of the bandwidth change trend, the second category is a video chunk of which the instant bandwidth change trend is between the minimum value of the bandwidth change trend and the maximum value of the bandwidth change trend, and the third category is a video chunk of which the instant bandwidth change trend is greater than the maximum value of the bandwidth change trend.

At block 405, searching whether a video chunk has a largest display of an aspect ratio needing to be displayed on the displaying device 50, if yes, goes on block 406, if no, goes on block 407.

At block 406, firstly downloading the video chunk has a largest display of the aspect ratio by the downloading module 35.

At block 407, searching a video chunk having a lowest instant bandwidth change trend by the searching module 36.

At block 408, firstly downloading the first category of video chunks that the instant bandwidth change trend is lower than the minimum value of the bandwidth change trend, secondly downloads the second category of video chunks of which the instant bandwidth change trend is between the minimum value of the bandwidth change trend and the maximum value of the bandwidth change trend, thirdly downloads the third category of video chunks of which the instant bandwidth change trend is greater than the maximum value of the bandwidth change trend. In at least one embodiment, when the instant bandwidth change trend is greater than the maximum value of the bandwidth change trend or less than the minimum value of the bandwidth change trend, the adjusting module is configured to adjust the instant bandwidth change trend to locate it between the minimum value of the bandwidth change trend and the maximum value of the bandwidth change trend.

At block 409, determining whether all the video chunks have been downloaded. If yes, the video content, including all the video chunks, can be displayed on the displaying device, if no, goes on block 401.

The embodiments shown and described above are only examples. Many details are often found in the art such as the other features of a system for dynamic control of downloading multiple videos. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A system for dynamic control of downloading multiple videos comprising:
   at least one electronic device comprising a video content comprising a plurality of video chunks;
   a client coupled to the at least one electronic device; and
   a displaying device coupled to the client and configured to display the video content;
   wherein the client is configured to:
      download each video chunk in a decreasing order of an aspect ratio and in an ascending order of a bandwidth change trend;
      sort the plurality of video chunks into an instant buffer insufficiency area and an instant buffer adequacy area, and a plurality of video chunks in the instant buffer insufficiency area is downloaded before a plurality of video chunks in instant buffer adequacy area is downloaded; and
      adjust an instant bandwidth change trend of downloading each video chunk.

2. The system of claim 1, wherein the plurality of video chunks in the instant buffer insufficiency area is downloaded by the client according to the decreasing order of the display of an aspect ratio and an ascending order of the instant bandwidth change trend, and the plurality of video chunks in the instant buffer adequacy area is downloaded by the client according to the ascending order of the instant bandwidth change trend.

3. The system of claim 1, wherein the bandwidth change trend comprising a maximum value of the bandwidth change trend and a minimum value of the bandwidth change trend, when an instant bandwidth change trend of downloading the plurality of video chunks is greater than the maximum value of the bandwidth change trend or less than the minimum value of the bandwidth change trend, the client is configured to adjust the instant bandwidth change trend to be located between the minimum value of the bandwidth change trend and the maximum value of the bandwidth change trend.

4. The system of claim 1, wherein the at least one electronic device is a server or a personal computer.

5. A method for dynamic control of downloading multiple videos, comprising:
   (a) dividing a video content into a plurality of video chunks,
   (b) downloading each video chunk in a decreasing order of an aspect ratio and in an ascending order of a bandwidth change trend, sorting the plurality of video chunks into an instant buffer insufficiency area and an instant buffer adequacy area, and downloading a plurality of video chunks in the instant buffer insufficiency area, before downloading a plurality of video chunks in instant buffer adequacy area;
   (c) adjusting an instant bandwidth change trend of downloading each video chunk; and
   (d) displaying the video content.

6. The method of claim 5, wherein the step (b) comprises following step b2: downloading the plurality of video chunks in the instant buffer insufficiency area according to the decreasing order of the display of an aspect ratio and an ascending order of the instant bandwidth change trend, and downloading the plurality of video chunks in the instant buffer adequacy area according to the ascending order of the instant bandwidth change trend.

7. The method of claim 5, wherein the bandwidth change trend comprising a maximum value of the bandwidth change trend and a minimum value of the bandwidth change trend, when an instant bandwidth change trend of downloading the plurality of video chunks is greater than the maximum value of the bandwidth change trend or less than the minimum value of the bandwidth change trend, adjusting the instant bandwidth change trend to be located between the minimum value of the bandwidth change trend and the maximum value of the bandwidth change trend.

* * * * *